United States Patent [19]

Jonnalagadda

[11] Patent Number: 5,029,003
[45] Date of Patent: Jul. 2, 1991

[54] APPARATUS FOR INCORPORATING DIGITAL SIGNALS WITH A STANDARD TV SIGNAL

[75] Inventor: Krishnamurthy Jonnalagadda, Plainsboro, N.J.

[73] Assignee: General Electric Company, Princeton, N.J.

[21] Appl. No.: 451,692

[22] Filed: Dec. 18, 1989

[51] Int. Cl.⁵ .......................... H04N 7/06; H04N 7/08
[52] U.S. Cl. .................................... 358/142; 358/143; 358/144
[58] Field of Search .......................... 358/12, 141–142, 358/143, 144, 197, 198; 375/39, 42, 43; 370/11, 20

[56] References Cited

U.S. PATENT DOCUMENTS

| | | | |
|---|---|---|---|
| 2,635,140 | 4/1953 | Dome | 178/5.2 |
| 2,838,597 | 6/1958 | De Vrijer | 178/5.2 |
| 3,530,232 | 9/1970 | Reiter et al. | 178/5.1 |
| 4,639,786 | 1/1987 | Tamer et al. | 358/197 |

FOREIGN PATENT DOCUMENTS

| | | |
|---|---|---|
| 0308241 | 3/1989 | European Pat. Off. |
| 46084 | 2/1988 | Japan |
| 86987 | 4/1988 | Japan |

OTHER PUBLICATIONS

Television Engineering Handbook; by Benson; p. 21.42, Figure 21-8; Jun. 1986.
Digital Multisound in Television, Feasibility of Filtered 728 kbits/s NICAM with 5.85 MHz Carrier Frequency in System B., CCIR Document 10/41-E; 11/47-E, Jul. 14, 1987.
Y. Yasumoto et al, "An Extended Definition Television System Using Quadrature Modulation of the Video Carrier with the Inverse Nyquist Filter", IEEE Transactions on Consumer Electronics, vol. CE-33, No. 3, Aug. 87, pp. 173-180.
M. Isnardi et al, "Decoding Issues in the ACTV System", IEEE Transactions on Consumer Electronics, vol. 34, No. 1, Feb. 88, pp. 111-120.
"Digital Sound Signals Multiplexed in Quadrature with TV Signals", paper authored by Hitachi Ltd. in ITEJ 17-6-88.

*Primary Examiner*—John W. Shepperd
*Attorney, Agent, or Firm*—Joseph S. Tripoli; Eric P. Herrmann; James B. Hayes

[57] ABSTRACT

A system for transmitting digital sound signals in a standard broadcast video signal includes apparatus for removing video signals from a portion of the vestigial sideband of the broadcast video signal and inserting coded digital sound signals therein.

6 Claims, 3 Drawing Sheets

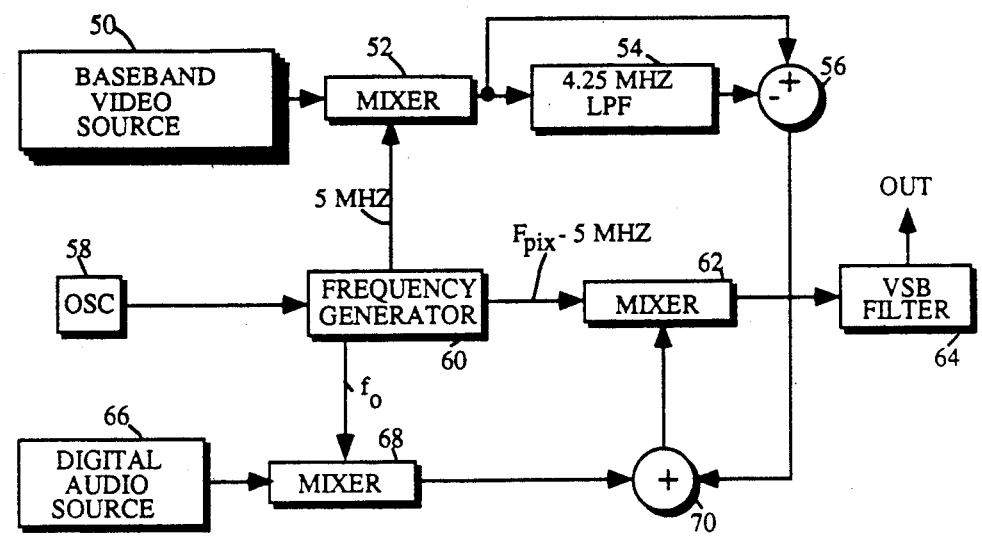
FIGURE 3
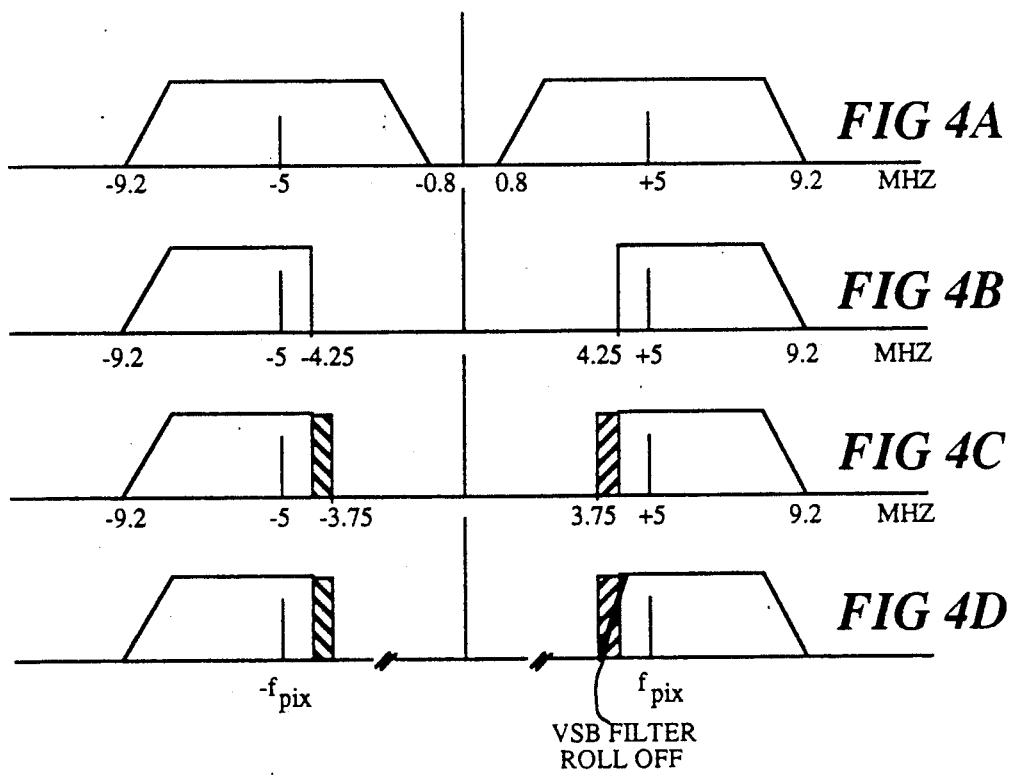

APPARATUS FOR INCORPORATING DIGITAL SIGNALS WITH A STANDARD TV SIGNAL

This invention relates to a system for including, for example, a high quality digital audio signal in a standard broadcast TV signal.

BACKGROUND OF THE INVENTION

Prior to the latter half of the 1980's television systems in, e.g., the United States provided only relatively low quality monophonic sound signals. In the latter half of the 1980's BTSC sound signals were incorporated in television signals. The BTSC sound signals include a monophonic signal compatible with earlier standards, and a stereo signal, permitting appropriately equipped receivers to reproduce stereophonic sound. The BTSC signal is an analog FM signal having a carrier frequency at 4.5 MHz (NTSC) above the picture carrier of the television signal.

Advances in digital audio equipment such as compact disc players (CD's) and digital tape recorders (DAT's) have made possible the reproduction of extremely high quality sound reproduction. It is desirable to incorporate such high quality sound reproduction in television receivers. However, due to bandwidth restrictions of existing television broadcast channels it is not possible to transmit sufficient audio information to emulate CD performance. It is possible, however, to incorporate a digital sound signal, albeit of lesser sample rates and resolution than CD signals, in a television signal, which will provide improvements over existing analog sound signals.

P.J.R. Court, in U.S. Pat. No. 3,231,818 describes a television system in which an auxiliary analog sound signal is included in a television signal. The auxiliary signal is an FM signal located in the vestigial sideband of the television signal and is of the same quality as the normal sound signal.

Craig C. Todd in a paper entitled "A Compatible Digital Audio Format for Broadcast and Cable Television", in the IEEE Transactions on Consumer Electronics, Vol. CE-33, No. 3, August 1987, pp. 297-305, describes a method for including a higher quality digital sound signal in a television signal. In this system a digital audio signal, in the form of a quadrature phase shift keying (QPSK) signal, is included in the television signal spectrum above the normal sound carrier. As such the QPSK signal resides at least partially in the vestigial sideband of the next higher adjacent broadcast channel, and tends to violate the bandwidth constraints established for a single broadcast channel.

R.B. Dome, in U.S. Pat. No. 2,635,140 teaches that plural video signals may be encoded in frequency interleaved fashion in the vestigial sideband (and elsewhere) of a video signal and the plural signals may be successfully separated in a receiver. However, the spectrum of audio signals is not conducive to frequency interleaving with video signals.

It is an object of the present invention to provide an auxiliary, high quality digital sound signal, in a broadcast television signal, within the frequency spectrum allotted for a single television signal channel.

SUMMARY OF THE INVENTION

The present invention includes apparatus for removing video signal from at least a portion of the vestigial sideband of a television signal and inserting a digital sound signal therein.

BRIEF DESCRIPTION OF THE DRAWINGS

FIG. 3 is a block diagram of alternative apparatus embodying the invention for encoding a video signal with an auxiliary digital sound signal.

FIGS. 4A-4D are spectral diagrams useful in understanding the operation of the FIG. 3 apparatus.

DETAILED DESCRIPTION

Figure 1:
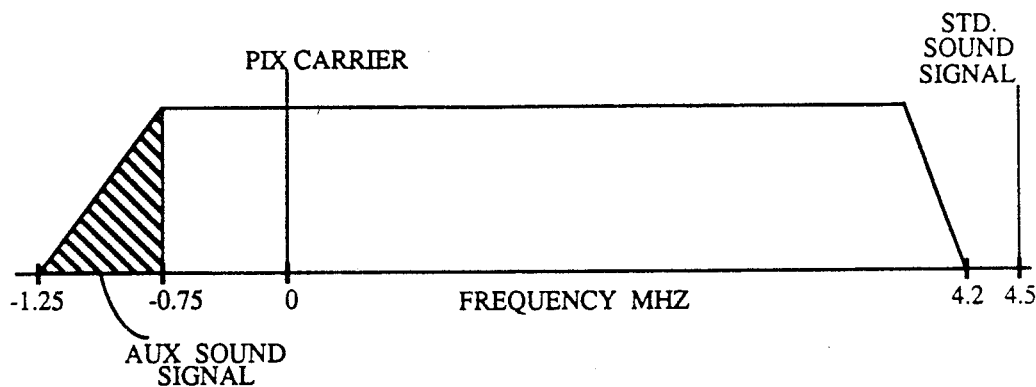
FIG. 1 is a spectral diagram of a broadcast television signal showing the location of the auxiliary sound signal.

FIG. 1 illustrates the frequency spectrum of an NTSC broadcast video signal. Normally this signal is generated by double sideband modulating an RF picture carrier with a baseband composite video signal and thereafter vestigial filtering the modulated signal to remove the majority of the lower sideband. After vestigial filtering a frequency modulated sound signal is added to the video signal. The FM sound signal is located just above the highest video signal frequency components. The vestigial sideband which nominally extends to 1.25 MHz below the picture carrier contains low frequency luminance information. This information is redundant with the signal extending from the picture carrier to 1.25 MHz above the picture carrier. It has been determined that a portion of the luminance information in the vestigial sideband may be replaced with auxiliary digital audio information without significantly affecting the video signal recovered by a receiver. However, if the auxiliary signal is located within 100 kHz of the picture carrier interference will occur in the sound signals recovered by standard receivers utilizing intercarrier sound detectors. Therefore, it is necessary to constrain an auxiliary signal, added into the vestigial sideband, to be at least 100 kHz below the picture carrier. In FIG. 1 the auxiliary signal spectrum is seen to extend from 1.25 MHz below the picture carrier to 0.75 MHz below the picture carrier, which is well within the foregoing constraint.

As the auxiliary signal is located closer to the edge of the vestigial sideband there is a lesser probability of any interference with either the recovered video signal or recovery of the standard sound signal. However, the transmitted energy of the auxiliary signal is also reduced, which adversely affects the bit error rate of the recovered auxiliary signal. In order to achieve acceptable bit error rates and substantially no interference with the video signal or the standard sound signal (in standard receivers) the energy of the auxiliary signal is preferably centered about 1.1 MHz below the picture carrier.

Figure 2:
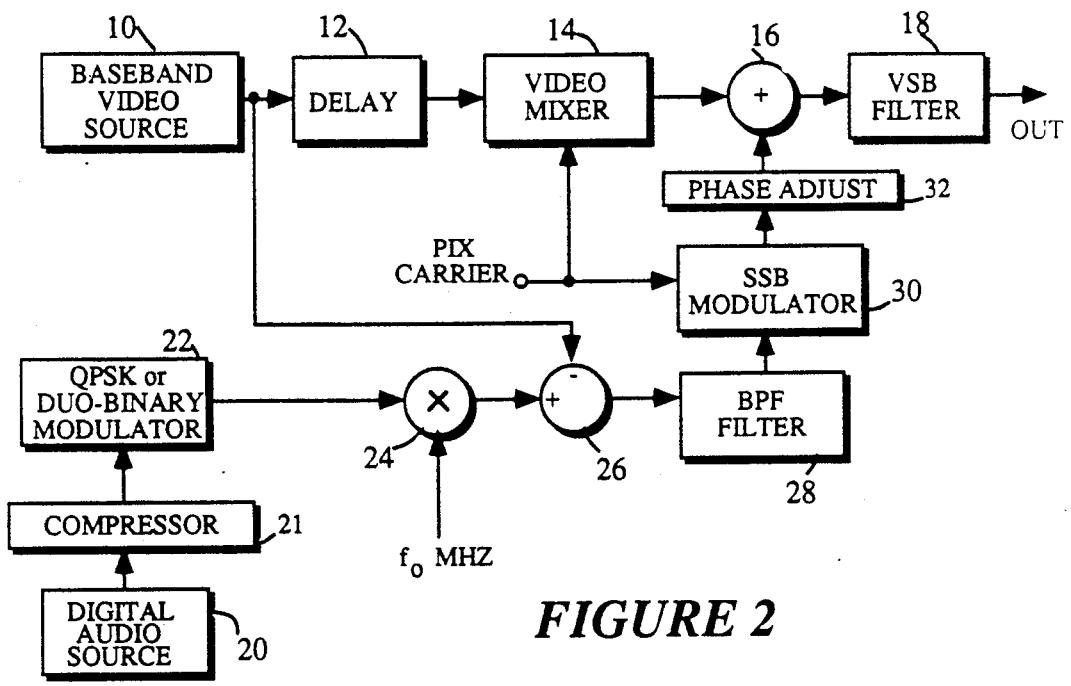
FIG. 2 is a block diagram of apparatus embodying the invention for encoding a video signal with an auxiliary digital sound signal.

FIG. 2 illustrates exemplary apparatus for introducing an auxiliary digital sound signal in the vestigial sideband of a standard broadcast video signal. Baseband composite analog video signal is provided by a source 10 which may include a color video camera and the appropriate processing circuitry to generate a composite video signal. The composite video signal is coupled to a video mixer 14 via a delay element 12. The video mixer 14, responsive to a RF picture carrier signal double sideband amplitude modulates the composite video signal. The modulated video signal is coupled to one input terminal of an adder circuit 16. The output of the adder circuit 16 is coupled to a vestigial sideband filter which provides a vestigial sideband video signal (absent the standard sound signal which is thereafter added by circuitry not shown) for transmission.

An auxiliary digital audio signal is provided by a source 20 which may include microphones, analog-to-digital converters and multiplexers to generate, e.g., a time division multiplexed digital stereo signal. Depending upon the bit rate of the digital stereo signal, the source 20 may also include compression apparatus such as an adaptive differential pulse code modulator to reduce the bit rate. The auxiliary digital audio signal from the source 20 is coupled to a modulator 22 which may be a quadrature phase shift keying (QPSK) modulator or a duo-binary modulator. The modulator 22 provides an auxiliary signal having a bandwidth in the order of one-quarter to three-quarters of one megahertz, typically extending to zero Hertz. Signal from the modulator 22 is applied to a multiplier 24 which, responsive to a signal frequency fo, translates the frequency spectrum of the auxiliary signal to a frequency band centered around about 1.1 MHz. The frequency fo may be a fixed multiple of the horizontal scan rate of the video signal and generated via phase locked loop circuitry coupled to the horizontal synchronizing component of the video signal.

The frequency translated auxiliary signal from the multiplier 24 is applied to the minuend input terminal of a subtracter circuit 26. Baseband composite video signal from the source 10 is coupled to the subtrahend input terminal of the subtracter circuit 26. The subtracter circuit 26 provides a signal which is the linear sum of the frequency translated auxiliary signal and polarity reversed composite video signal. This combined signal is applied to a single sideband modulator 30 via a bandpass filter 28. The bandpass filter 28 attenuates signal outside the frequency spectrum occupied by the frequency translated auxiliary signal. Typically the passband of the filter 28 will be between one-half and three-quarter megahertz centered about 1.1 MHz.

The single sideband modulator 30 is responsive to the picture carrier to single sideband modulate the band passed combined signal. The modulated sideband provided by the modulator 30 is the lower sideband. The modulator 30 is selected such that if the entire spectrum of the composite video signal were applied thereto, the spectrum of its output signal would coincide with the lower sideband of the modulated signal provided by the mixer 14.

The signal provided by the modulator 30 is coupled to a second input of the adder 16. The video signal component of the signal provided by modulator 30 is antiphase to the corresponding video signal component provided by the mixer 14, hence these components cancel, leaving only the auxiliary signal in the frequency band passed by filter 28 and modulator 30. That is, modulated video signal in a frequency band equivalent to the passband of the filter 28 and centered about 1.1 MHz below the picture carrier is eliminated. In its place the auxiliary signal is added.

Note the delay element 12 is included to compensate for differences in processing delays between the two signal paths which converge at the adder 16, and insure that corresponding portions of the inphase and antiphase video signals are time aligned. Note further that it may be advantageous to include phase and/or amplitude adjusting circuitry 32 between the modulator 30 and the adder 16, to trim the single sideband modulated signal to insure cancellation of the video components.

The apparatus of FIG. 2 may be rearranged by connecting the modulator 30 to the subtracter 26 and connecting the bandpass filter between the modulator 30 and the adder 16. In this instance the bandpass filter must be selected to pass the appropriate RF band of frequencies centered at, e.g., 1.1 MHz below the picture carrier. In addition the modulator 30 may be a video mixer similar to mixer 14 which provides a double sideband modulated signal.

FIG. 3 illustrates an alternative embodiment of the invention. In FIG. 3, baseband composite video signal from a source 50 is coupled to a mixer 52. The mixer 52, responsive to a constant frequency signal from a frequency generator 60, provides a double sideband modulated signal centered about the frequency of the signal provided by the generator 60. In FIG. 3 the frequency provided by the generator 60 is indicated as 5 MHz, however any convenient frequency may be utilized provided it is at least as high as the highest frequency component of the composite video signal provided by the source 50.

FIG. 4A illustrates the frequency spectrum of the modulated signal provided by the mixer 52, wherein it is assumed that the bandwidth of the composite video signal spans the frequency range of zero to 4.2 MHz.

Output signal from the mixer 52 is coupled to a lowpass filter 54 and to the minuend input terminal of a subtracter 56. Output signal from the lowpass filter 54 is coupled to the subtrahend input terminal of the subtracter 56. The combination of filter 54 and subtracter 56 forms a high pass filter which passes signal frequencies above the upper cutoff frequency of the filter 54. The upper cutoff frequency of the lowpass filter 54 is selected to be 0.75 MHz below the mixing frequency provided to mixer 52 (i.e., 0.75 MHz below 5 MHz or 4.25 MHz in the FIG. 3 example). The frequency spectrum of the output signal provided by the subtracter 56 is illustrated in FIG. 4B, in which it may be seen that the lower sideband below 0.75 MHz from the 5 MHz carrier has been removed. The output signal from the subtracter 56 is coupled to one input terminal of an adder 70.

Auxiliary digital audio signal is provided by a source 66, which may include the apparatus of elements 20 and 22 in FIG. 2. The auxiliary signal is coupled to a mixer 68. The mixer 68 is responsive to a constant frequency signal Fo, to translate the frequency spectrum of the auxiliary signal to the frequency band 0.75 MHz to 1.25 MHz below the 5 MHz carrier. Output signal from the mixer 68 is coupled to a second input terminal of the adder 70. The frequency spectrum of the signal provided by the adder 70 is illustrated in FIG. 4C, wherein the crosshatched block indicates the portion of the spectrum occupied by the auxiliary signal. It can be seen that the auxiliary signal and the composite video signal occupy substantially exclusive portions of the frequency spectrum. It will be appreciated by those persons skilled in the art of filter design that FIG. 4C is an ideal representation. Practically the "boxcar" filter response represented in FIG. 4B for the composite video signal, and the "boxcar" spectrum representing the auxiliary signal in FIG. 4C cannot be achieved. Thus, there will be some mixing of the auxiliary signal and composite video signal around the frequency of 4.25 MHz.

Selection of the frequency fo is determined by the form and frequency spectrum of the auxiliary signal provided by the source 66. For example, if the auxiliary signal is in duo-binary format occupying the frequency band from zero to 250 kHz, then the frequency fo will be selected to be 4 MHz in the FIG. 3 example). Note that if the bandwidth of the auxiliary signal provided by the source 66 is greater than one half the space provided in the vestigial sideband for the auxiliary signal, and if the mixer 68 generates a double sideband signal, it may be necessary to include a bandpass filter between the mixer 68 and the adder 70, to limit the signal provided to the adder 70 to a single sideband.

The output signal from the adder 70 is coupled to a mixer 62 which is responsive to a constant frequency signal, Fpix−5 MHz, to modulate the combined signal from the adder 70 to the RF spectrum. The constant frequency Fpix−5 MHz is equal to the frequency of the desired RF carrier Fpix minus the frequency of the constant frequency signal applied to the mixer 52. The resulting carrier frequency of the RF signal provided by the mixer 62 is therefore Fpix. The spectrum of the signal provided by the mixer 62 is illustrated in FIG. 4D.

Signal from the mixer 62 is coupled to a vestigial sideband filter 64, the output of which is indicated in the upper sideband of the spectrum illustrated in FIG. 4D.

Preferably the rolloff of the vestigial sideband filter will have a linear characteristic or at least symmetric skirts so as not to introduce distortion in the auxiliary signal, e.g., where the auxiliary signal is in duo-binary format. If the auxiliary signal is in QPSK format, either it should not extend into the rolled off portion of the vestigial sideband or if it does extend into the rolled off portion of the vestigial sideband, then the auxiliary signal should be predistorted via a transfer function having a transfer characteristic complementary to the VSB filter, prior to application to the VSB filter.

The constant frequency signals applied to the mixers 52, 62 and 68 are generated by the frequency generator 60. The frequency generator 60 may include conventional counting circuits responsive to a carrier frequency fpix from an oscillator 58 to generate the requisite frequencies. Alternatively generator 60 may include phase locked loop circuitry responsive to horizontal synchronizing pulses from the video circuitry to generate the lower frequency signals (i.e $f_o$ and 5 MHz), and mixer circuitry responsive to a picture carrier from the oscillator 58 and to the, e.g 5 MHz signal, for generating the RF carrier Fpix−5 MHz.

Figure 5:
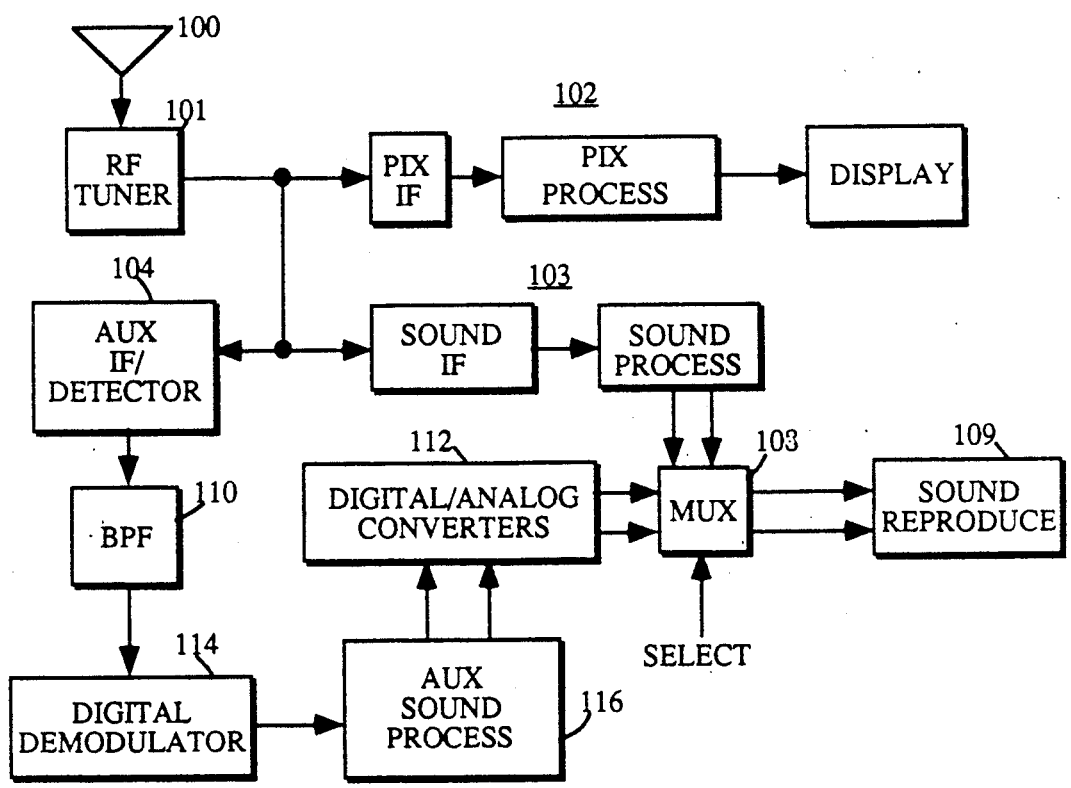
FIG. 5 is a block diagram of receiver apparatus for decoding a video signal including an auxiliary digital sound signal.

FIG. 5 shows the receiving end of the system for transmitting an auxiliary digital sound signal in a standard TV signal. In FIG. 5 the transmitted signal is received by an antenna 100 and coupled to a tuner section 101. The RF signal from the tuner is applied to a conventional video processor 102 for generating a visual display. Note that the auxiliary signal, being in the vestigial sideband is substantially attenuated by the Nyquist filter function of conventional picture IF circuitry and thus does not interfere with the picture processing.

The RF signal from the tuner is coupled to conventional sound processing circuitry 103 which extracts and processes the conventionally transmitted sound signal. Audio signals from the circuitry 103 are coupled to a multiplexer 108, the output of which is coupled to sound reproduction apparatus 109. The apparatus 109 may include amplifiers and speakers. The other input to the multiplexer is the auxiliary sound signal which under normal conditions, and being a digital signal, is assumed to be of higher quality than the conventionally transmitted sound signal. The multiplexer 108 is controlled by a SELECT signal which may be manually provided by the user of the receiver or internally generated as a function of, e.g., the signal/noise ratio of the auxiliary signal, the conventional sound signal or both, etc.

The RF signal from the tuner 101 is coupled to an auxiliary IF/detector circuit 104 which is tailored to respond to the vestigial sideband of the transmitted signal. The circuitry 104, may include a mixer to translate the RF signal provided by the tuner to a frequency near baseband. The IF mixing frequency is selected to prevent fold over of luminance into the band occupied by the auxiliary signal. Typically this IF mixing frequency will be different than the IF frequency utilized by the picture IF circuitry.

The frequency translated signal from the auxiliary detector 104 is applied to a filter 110 having a passband tailored to pass the auxiliary signal. The filtered signal is applied to digital demodulator 114 which may include e.g. a QPSK decoder or a duo-binary decoder for example. If the original digital sound signal was compressed at the transmitter, the demodulator 114 will also include decompression or expansion circuitry having the inverse transfer function to the compression circuitry. Output signal from the demodulator 114 corresponds to recovered audio signal. This signal is coupled to a digital auxiliary sound processing circuit 116 which may include tone and balance controls for adjusting right and left channels of a stereo sound signal etc. Signals from the processor 116 are applied to the digital-to-analog converting circuitry 112 which converts the processed digital audio signals to analog audio signals. The analog audio signals are there after coupled to respective signal input terminals of the multiplexer 108.

The foregoing description has been directed to adding a digital audio signal to a broadcast video signal. It will readily be appreciated by those skilled in the art of signal processing that the invention may be utilized for adding signals other than audio signals, such as high frequency luminance signals or image motion vector signals to the broadcast video signals. In addition, the invention is not constrained to usage of broadcast signals, but is equally applicable to signals utilized for, e.g., cable transmission.

What is claimed is:

1. Apparatus for combining an auxiliary signal for transmission with a standard vestigial sideband video signal comprising:
    a source of baseband composite video signal;
    a source of auxiliary signal;
    a source of constant frequency signal;
    mixing means, responsive to said composite video signal and said constant frequency signal for generating a double sideband modulated signal;
    filter means responsive to said double sideband modulated signal for removing at least a contiguous portion of signal from one of said double sidebands to generate a modified double sideband signal, which portion includes a band of frequencies located in a range of frequencies between 0.1 MHz and 1.25 MHz from said constant frequency;

means responsive to said auxiliary signal for conditioning said auxiliary signal to occupy said band of frequencies;

means for combining said auxiliary signal occupying said band of frequencies with said modified double sideband signal to generate a combined signal;

an RF mixer coupled to said means for combining and responsive to an RF carrier for modulating signal provided by said means for combining; and a vestigial sideband filter coupled to said RF mixer.

2. The apparatus set forth in claim 1 wherein said means for combining said auxiliary digital signal occupying said band of frequencies with said modified double sideband signal includes an adder coupled to said filter means and to said means responsive to said auxiliary digital signal for conditioning said auxiliary digital signal to occupy said band of frequencies.

3. Apparatus for combining an auxiliary digital signal for transmission with a standard vestigial sideband video signal comprising:
- a source of baseband composite video signal;
- a source of auxiliary digital signal;
- a source of first constant frequency signal;
- a source of second constant frequency signal;
- a source of an RF constant frequency signal;
- first mixing means, responsive to said baseband composite video signal and said first constant frequency signal, for generating a double sideband amplitude modulated video signal;
- filter means responsive to said double sideband amplitude modulated video signal for removing at least a contiguous portion of signal from one of said double sidebands to generate a modified double sideband signal, which portion includes a band of frequencies located in a range of frequencies between 0.1 MHz and 1.25 MHz from said first constant frequency;
- second mixing means, responsive to said auxiliary digital signal and said second constant frequency signal for conditioning said auxiliary digital signal to occupy said band of frequencies;
- an adder for combining said auxiliary digital signal occupying said band of frequencies and said modified double sideband signal;
- third mixing means, coupled to said adder, and responsive to said RF constant frequency signal, for mixing signal provided by said adder to provide a double sideband amplitude modulated signal; and
- a vestigial sideband filter coupled to said third mixing means for providing a vestigial sideband video signal.

4. The apparatus set forth in claim 3 wherein said first constant frequency signal has a frequency significantly less than said RF constant frequency signal, but greater than the highest frequency exhibited by said baseband composite video signal.

5. The apparatus set forth in claim 3 wherein said RF constant frequency signal has a frequency equal to the frequency of a standard picture carrier less the frequency of said first constant frequency signal.

6. The apparatus set forth in claim 3 wherein said second constant frequency signal exhibits a frequency substantially 1.1 MHz less than said first constant frequency.

* * * * *